United States Patent
Hatfield, Jr.

(10) Patent No.: US 6,863,425 B2
(45) Date of Patent: Mar. 8, 2005

(54) MOTORCYCLE ACCESSORY RIDING LIGHT

(75) Inventor: Lawrence Hatfield, Jr., Butler, KY (US)

(73) Assignee: Let's Roll, Inc., Cincinnati, OH (US)

( * ) Notice: Subject to any disclaimer, the term of this patent is extended or adjusted under 35 U.S.C. 154(b) by 24 days.

(21) Appl. No.: 10/374,557

(22) Filed: Feb. 25, 2003

(65) Prior Publication Data

US 2004/0165396 A1 Aug. 26, 2004

(51) Int. Cl.[7] .................................................. B62J 6/00
(52) U.S. Cl. ...................... 362/473; 362/368; 362/370; 362/430; 362/371; 362/474
(58) Field of Search ................... 362/473, 475, 362/476, 368, 370, 371, 474, 430

(56) References Cited

U.S. PATENT DOCUMENTS

| | | | |
|---|---|---|---|
| 4,024,388 A | 5/1977 | Skoff | 240/7.55 |
| 4,495,553 A | 1/1985 | Haynes | 362/311 |
| 4,686,656 A | 8/1987 | Morishima | 362/72 |
| 5,791,760 A | 8/1998 | Scherbarth et al. | 362/72 |
| 5,820,254 A | * 10/1998 | Duenas | 362/473 |
| 5,964,312 A | 10/1999 | Maldonado | 180/227 |

* cited by examiner

Primary Examiner—Sandra O'Shea
Assistant Examiner—Bertrand Zeade
(74) Attorney, Agent, or Firm—Wood Herron & Evans, LLP

(57) ABSTRACT

An accessory riding light for motorcycles may be mounted to a pre-existing fastener location on a motorcycle, or to any surface where a tapped hole may be formed on the motorcycle. In one embodiment, the light includes a light bulb couplable to the electrical system of a motorcycle, a housing for supporting the light bulb, and a bracket configured to mount the housing to a pre-existing fastener hole of the motorcycle. The light may be mounted at the sides of the motorcycle, below the headlight, to supplement illumination of the driving surface and to enhance visibility of the motorcycle.

9 Claims, 5 Drawing Sheets

MOTORCYCLE ACCESSORY RIDING LIGHT

FIELD OF THE INVENTION

The present invention pertains to lighting for motor vehicles, and more particularly to an accessory riding light for motorcycles.

BACKGROUND OF THE INVENTION

Lighting systems for motorcycles are important to provide illumination of driving surfaces in dark or low visibility conditions and to improve the visibility of motorcycles to other vehicles and pedestrians. While motorcycles have typically been provided with a main headlight for illuminating the road ahead of the motorcycle, headlights are generally mounted high on the handlebars, and thus illumination of the road immediately in front of the motorcycle is degraded. To improve the illumination of the road, many motorcycle operators choose to add accessory lights on lower portions of the motorcycle to supplement the illumination provided by the main headlight.

In addition to providing improved illumination of the road, such accessory lighting may also provide benefits in terms of improved safety. While headlights may be visible to drivers of other vehicles on the road, the fact that motorcycles generally have a single headlight, or closely spaced pairs of headlights, makes it difficult for other drivers to adequately determine the distance and rate of speed of a motorcycle moving toward them. The results of a traffic safety study indicated that 75% of motorcycle accidents involve collision with other vehicles, and that the predominating cause of such accidents was the failure of other motorists to detect and recognize approaching motorcycles. Accordingly, the frequency of accidents involving motorcycles may be decreased when the motorcycles are provided with additional lights which are lower than the headlight and spaced on opposite sides of the motorcycle to provide additional visual references for determining the distance and rate of speed of an approaching motorcycle.

Conventionally available accessory lights for motorcycles have typically been mounted to the forks or fork sliders of a motorcycle front suspension, or to engine guards positioned at the sides of a motorcycle. Mounting of these prior accessory lights has generally been accomplished by clamping the light to a tubular portion of these structural components. For example, one such conventional accessory light comprises a light bar that is designed to be mounted to an upper portion of the forks, commonly referred to as the "triple tree." This prior accessory light is mounted high on the motorcycle and near the main headlight, thus the accessory lights tend to appear as a single light, together with the headlight, when viewed from a distance. These high-mounted lights also create a glare for oncoming drivers and provide marginal illumination of the road surface.

When the accessory lights are clamped to the forks or fork sliders, care must be taken to position the light in a location where adequate clearance is provided as the fork slider slides along the forks, so as not to damage the light or other components of the motorcycle. If a particular motorcycle is not provided with engine guards, then mounting of an accessory light to an engine guard is not an option. In other situations, motorcycle operators may elect not to outfit their motorcycles with accessory lights due to the inconvenience of having to modify the motorcycle.

Accordingly, there is a need for an alternative accessory riding light for motorcycles that can be easily mounted to existing structure of the motorcycle and which does not require extensive modification of the motorcycle.

SUMMARY OF THE INVENTION

The present invention provides an accessory riding light for motorcycles. The light may be easily mounted to a motorcycle without requiring extensive modification of the motorcycle's components and provides an alternative to mounting to a motorcycle's forks, fork sliders, or engine guards. Advantageously, the riding light may be mounted to locations on the motorcycle below the headlight to provide supplemental illumination of the driving surface and to increase visibility of the motorcycle.

In one exemplary embodiment, the riding light includes a light bulb that may be connected to a motorcycle's electrical system, a housing for supporting the light bulb, and a bracket configured to mount the housing to a pre-existing fastener mounting hole on the motorcycle. Accordingly, the light may easily be installed on the motorcycle by removing a pre-existing fastener, positioning the riding light adjacent the pre-existing fastener hole, and re-installing the fastener.

In another aspect of the invention, the bracket is configured to mount to a pre-existing fastener hole on a bracket that supports the brake caliper assembly of a motorcycle.

In another aspect of the invention, a bracket for mounting a riding light to a pre-existing fastener hole on a motorcycle includes a first bracket member configured to couple the bracket to the motorcycle proximate the pre-existing fastener hole, and a second bracket member configured to coupled the bracket to a housing of a riding light.

In yet another aspect of the invention, a method for mounting a riding light to a motorcycle includes, coupling the light to a bracket, and coupling the bracket to the motorcycle adjacent a pre-existing fastener hole.

The features and objectives of the present invention will become more readily apparent from the following Detailed Description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
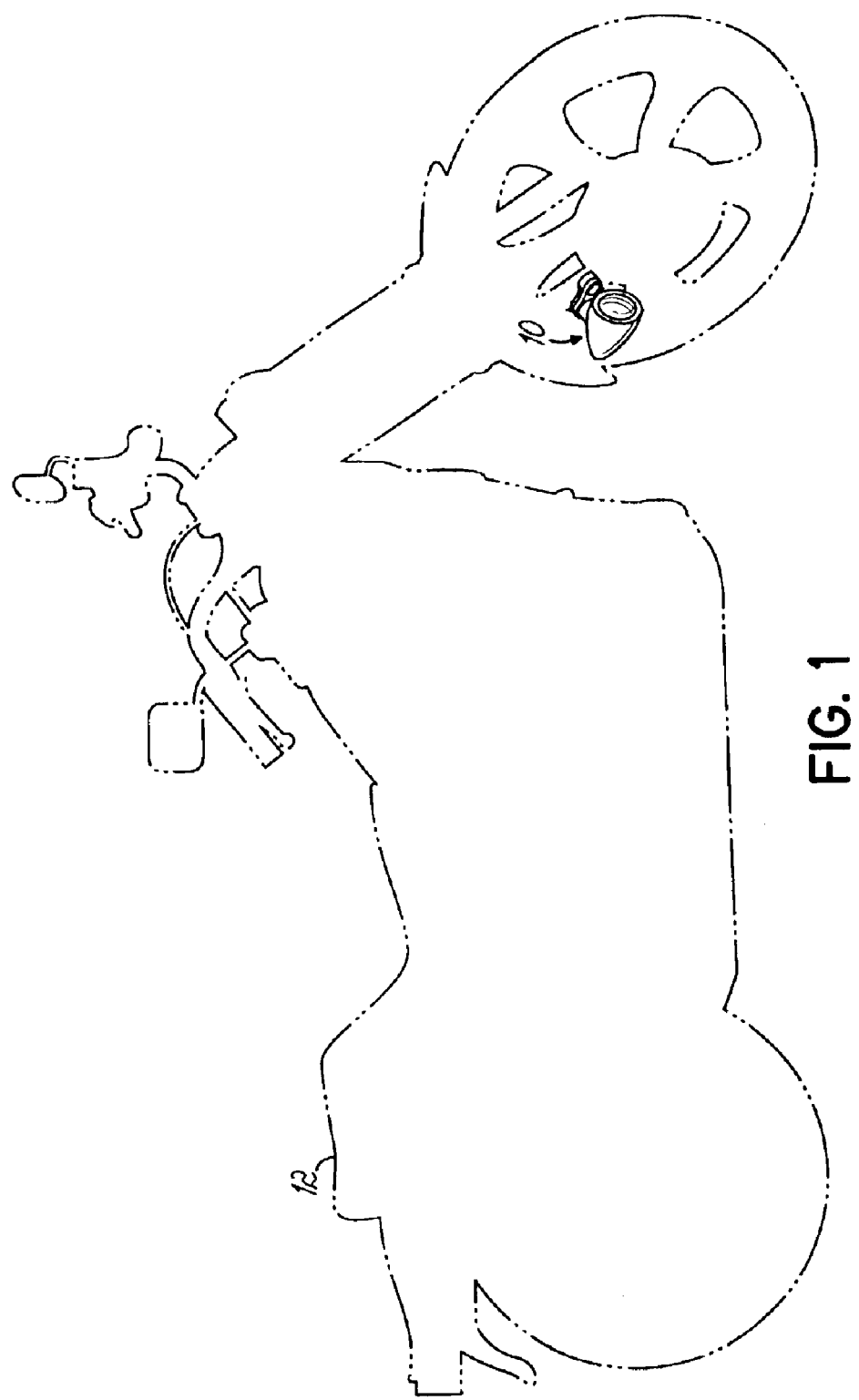
FIG. 1 is a perspective view of an exemplary motorcycle riding light of the present invention with a motorcycle shown in phantom for illustrative purposes.
Figure 2:
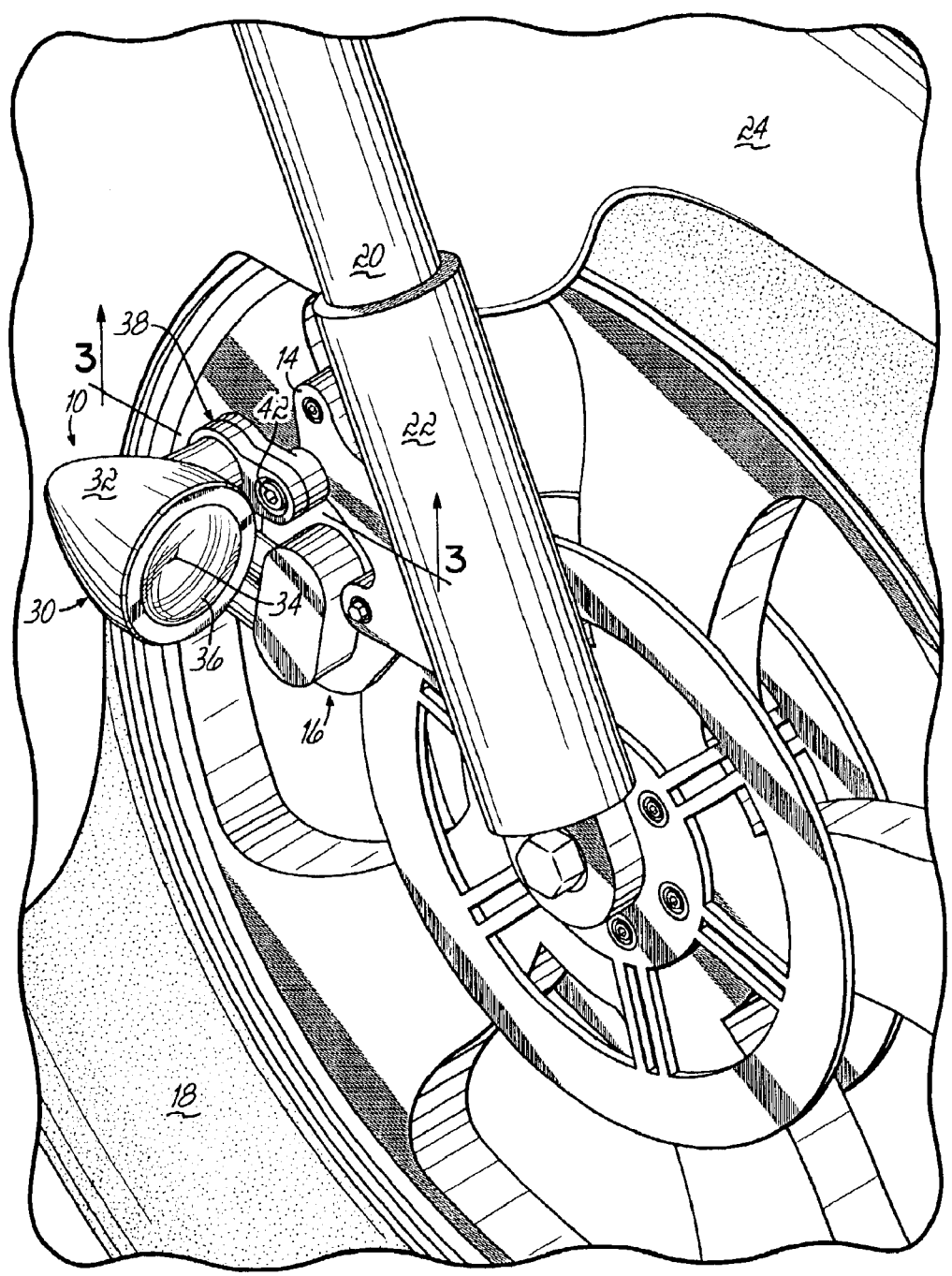
FIG. 2 is a detailed perspective view depicting the exemplary light of FIG. 1 mounted to a brake caliper bracket of the motorcycle.

Referring to FIGS. 1 and 2, there is shown an exemplary accessory riding light 10 for a motorcycle 12 according to the present invention. Advantageously, the riding light 10 may be mounted to a structural part of the motorcycle 12 at a position lower than the main headlight of the motorcycle 12. In the exemplary embodiment shown in FIGS. 1 and 2, the riding light 10 is mounted to a bracket 14 for the brake caliper 16 of the motorcycle 12. However, it will be recognized by those of ordinary skill in the art that the exemplary riding light 10 may alternatively be mounted to other positions on the motorcycle 12, as will be more fully described below.

Figure 3:
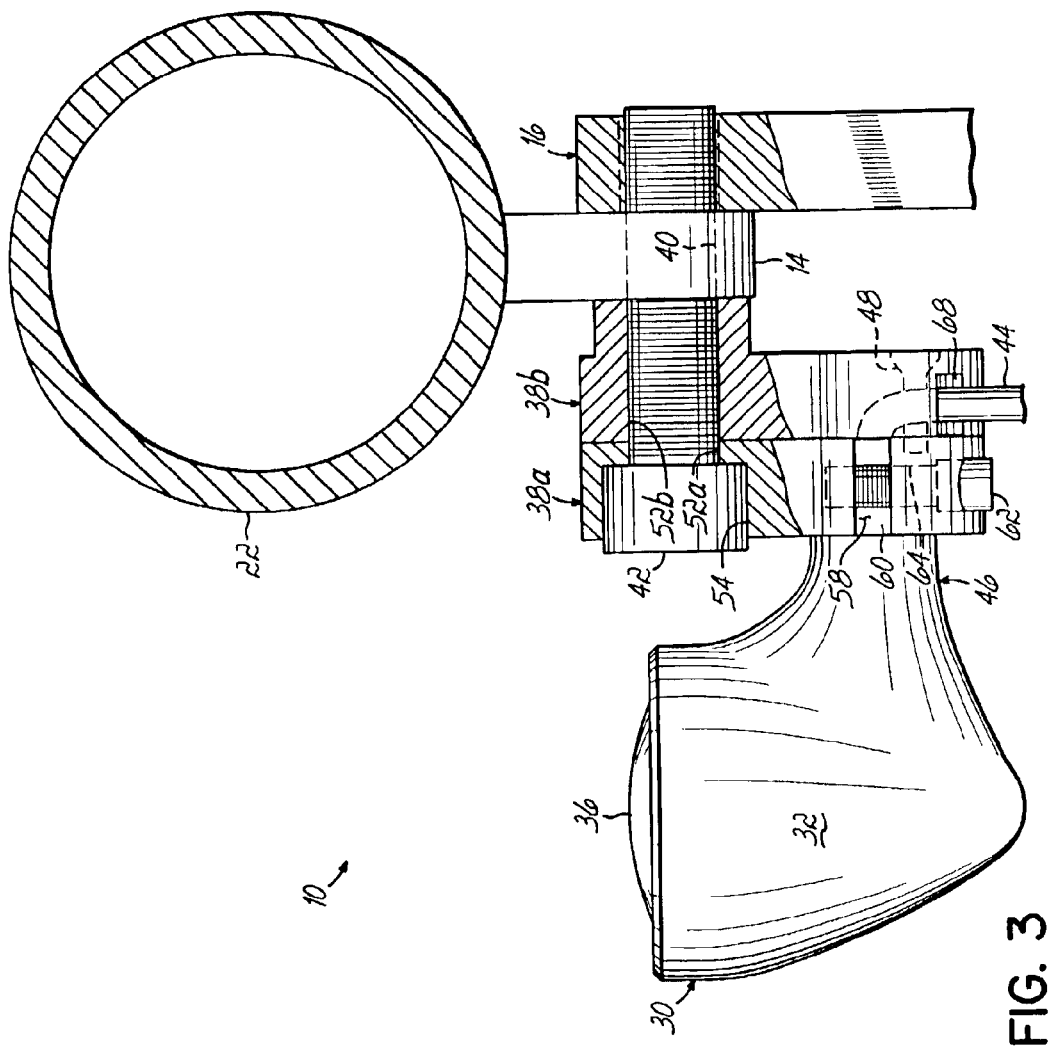
FIG. 3 is a partial cross-sectional view of the assembly of FIG. 2, viewed from beneath the light.

Referring now to FIGS. 2–3, the exemplary riding light 10 is mounted on the right-hand side of motorcycle 12 to a brake caliper mounting bracket 14 which supports a brake caliper assembly 16 for the front wheel 18 of the motorcycle 12. Bracket 14 is a structural element of the motorcycle 12 and is generally provided on a fork slider 22 of the front wheel 18. Bracket 14 includes at least one through-bore 40 (see FIG. 3) to which the brake caliper assembly 16 is mounted by threaded bolts which engage corresponding tapped holes 26 in the brake caliper assembly 16. Riding light 10, particularly the member thereof which mounts to the brake caliper bracket 14, is configured such that the light beam therefrom is sufficiently spaced from the brake caliper mounting bracket 14 to avoid interference with other components of the motorcycle 12, such as front fork 20, fork slider 22, and fender 24, and to position the light 10 at a position for illuminating the road ahead of the motorcycle 12 and for providing enhanced visibility of the motorcycle 12 by other drivers. The riding light 10 comprises a light assembly 30 including a light housing 32 configured to support a light bulb 34 within the interior of the housing 32. The light assembly 30 may further include a lens 36 coupled to the housing 30 for protecting the light bulb 34.

Riding light 10 further includes a bracket 38 configured to be mounted to the motorcycle 12 adjacent a pre-existing fastener hole 40 (see FIG. 3) on a structural component of the motorcycle 12, such as the brake caliper bracket 14. Accordingly, the riding light 10 may easily mounted to the motorcycle 12 by removing a pre-existing fastener 42 of the brake caliper mounting bracket 14, positioning the riding light 10 adjacent the pre-existing hole 40, and reinstalling the fastener 42 to secure the riding light 10 adjacent the pre-existing hole 40. It will be recognized that, in some instances, a longer fastener may be required to account for the thickness of the riding light bracket 38. In this manner, riding light 10 "piggy backs" on the brake caliper mounting bracket 14 such that the same (or a lengthened version) fastener 42 can be used to fasten both the light 10 and the brake caliper assembly 16 to the bracket 14 on the motorcycle.

Figure 4:
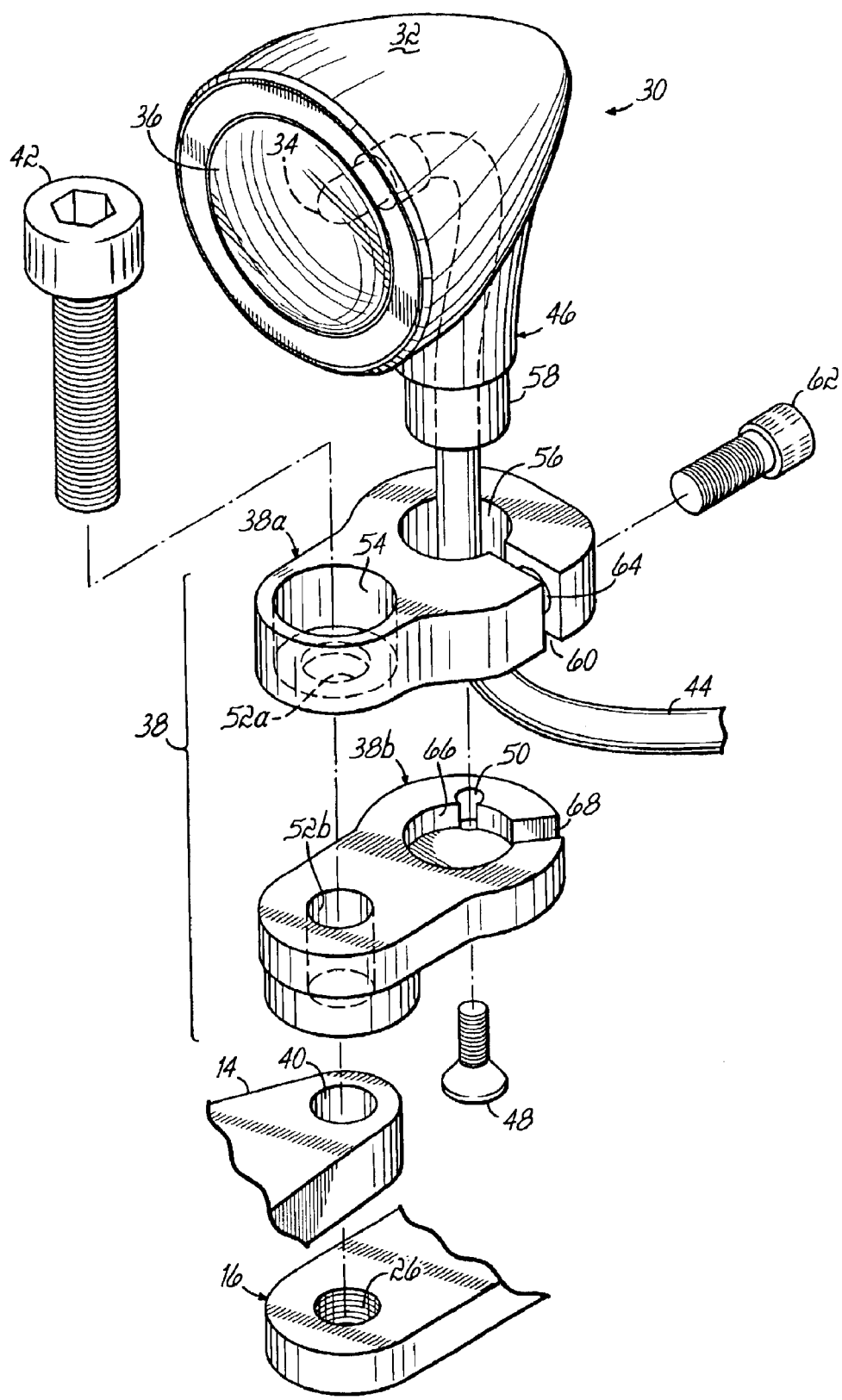
FIG. 4 is an exploded perspective view of the exemplary riding light of FIGS. 1 and 2.

Referring now to FIG. 4, an exemplary riding light 10 configured for mounting on the left-hand side of motorcycle 12 is depicted in even greater detail. The left-hand configuration is similar in overall design to the right-hand configuration of FIGS. 1–3, but has a bracket 38 adapted for mounting to the left-side components of motorcycle 12. As shown in FIG. 4, the riding light 10 includes a light bulb 34 that may be connected to the electrical system of the motorcycle 12 by an electrical conductor 44 coupled to the bulb 34 and extending from the housing 32, whereby appropriate connection to the motorcycle electrical system may be made. In the exemplary embodiment shown, the light housing 32 includes a stem 46 extending from the housing 32 and the electrical conductor 44 extends from the housing 32 through an aperture (not shown) in the stem 46.

With continued reference to FIG. 4, the riding light bracket 38 comprises a first bracket member 38a configured to be coupled to the light housing 32 and a second bracket member 38b configured to be coupled to the pre-existing fastener hole 40 of the motorcycle 12. The first and second bracket members 38a, 38b may be removably secured to one another by a threaded fastener 48 which passes through a corresponding first through-bore 50 in the bracket members 38a, and threadedly engages a threaded blind hold appropriately located in the underside of the bracket member 38b wherein only the first through-bore 50 of the second bracket member 38b is visible in FIG. 3. While the first and second bracket members 38a, 38b are illustrated and described herein as being coupled together by a threaded fastener 48, it will be recognized that the first and second bracket members 38a, 38b may be coupled together in various other ways. Alternatively, it will be recognized by those skilled in the art that the riding light bracket 38 may comprise only a single bracket member configured to be coupled to both the light housing 32 and the pre-existing fastener hole 40 located on the motorcycle 12, as described below with respect to FIG. 5.

In the exemplary embodiment shown, the first and second bracket members 38a, 38b further include cooperating second through-bores 52A and 52B sized to slidably receive a fastener 42 adapted to be installed through the pre-existing fastener hole 40 and to threadably engage tapped hole 26 in brake assembly 16. In this manner, the first and second bracket members 38a, 38b may be secured to the motorcycle structure adjacent the pre-existing fastener hole 40. The first bracket member 38a also includes a recess 54 formed in the upper surface of the first bracket member 38a proximate the second aperture 52, whereby the fastener 42 securing the riding light 10 to the motorcycle 12 is recessed within the first bracket member 38a in the installed condition. The first bracket member 38a further includes a mounting bore 56 configured to engage a tubular mounting member 58 extending from the end of the stem 46 of the housing 32. In the exemplary embodiment shown, the mounting member 58 comprises a stepped tubular section disposed at a distal end of the stem 46 of the light housing 32.

To secure the light housing 32 to the first bracket 38a, the electrical conductor 44 from the light housing 32 extending from the stem 46 is routed through the mounting bore 56 and the mounting member 58 is inserted into the mounting bore 56. Advantageously, an adjustment gap 60 may be formed into first mounting bracket 38a to cooperate with the mounting bore 56, such that the size of the bore 56 may be adjusted by tightening or loosening a cap screw 62 installed through an unthreaded bore 64 formed into the first bracket member 38a which passes across the adjustment gap 60 and threadably engages a threaded bore (not shown) aligned with bore 64. In this manner, the mounting bore 56 may be caused to frictionally engage the mounting member 58 of the housing 32 by tightening of the screw 62.

While the exemplary riding light 10 has been described above as having a light housing 32 couplable to light bracket 38 by frictional engagement between mounting member 58 and mounting bore 56, it will be recognized by those skilled in the art that there are many other ways to couple light housing 32 to bracket 38. For example, light housing 32 may alternatively be coupled to bracket 38 by providing threads on stem 46 for engagement with corresponding threads provided on bracket 38, or for engagement with a nut configured to clamp bracket 38 onto stem 46. As another example, light housing 32 may also be secured to bracket 38 by a set screw installed through bracket 38 to engage stem 46.

To accommodate the electrical conductor 44 extending from the stem 46 of the light housing 32 and through the mounting bore 56 in first bracket member 38a, the upper surface of the second bracket member 38b is provided with a recess 66 configured to accommodate that section of the electrical conductor 44 extending from beneath the first bracket member 38a. The second bracket member 38b further includes a passage 68 through which electrical conductor 44 may extend to permit convenient routing of the electrical conductor 44 from the assembled riding light 10 to the motorcycle's source of electrical power. The two-piece bracket 38, comprising the first and second bracket members 38a, 38b, thus facilitates quick and efficient assembly of the riding light 10 and the associated routing of the electrical conductor 44 for connection to the electrical system of the motorcycle 12.

Accordingly, the present invention provides an accessory riding light 10 for motorcycles which can be mounted to a lower structural part of the motorcycle 12, below the level of the headlight, to provide an aesthetically pleasing lighting arrangement. The low-mounted lights 10 provide supplemental illumination of the driving surface in front of the motorcycle 12 and enhance the visibility of the motorcycle 12 by others.

Figure 5:
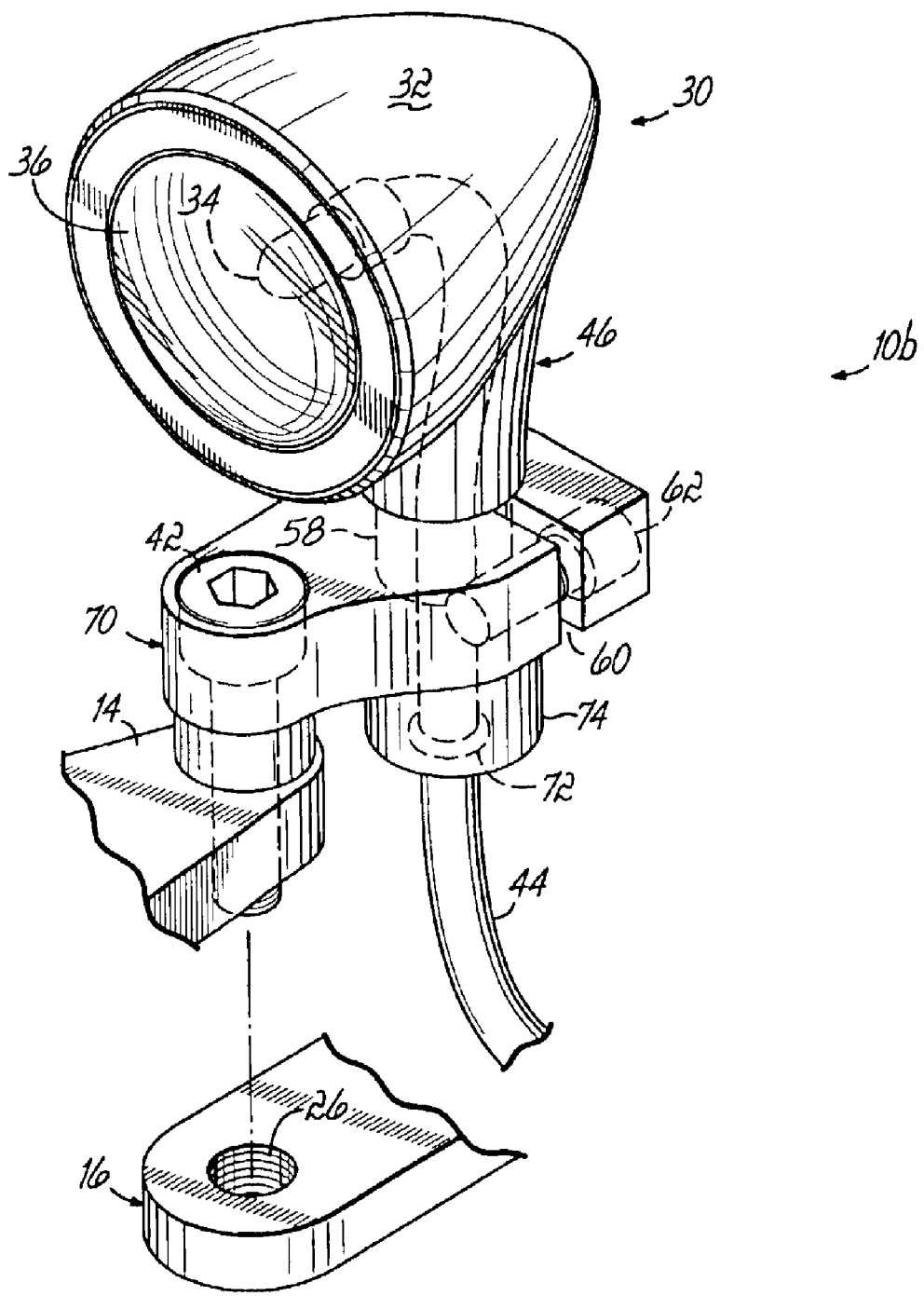
FIG. 5 is a perspective view, similar to FIG. 4, depicting another exemplary riding light of the present invention.

Referring now to FIG. 5, there is shown another exemplary riding light 10a of the present invention, similar to the riding light 10 described above, wherein like components have been similarly numbered. Riding light 10a includes a light bracket 70 of one-piece construction, but otherwise similar to the light bracket 38 shown in FIGS. 2–4. In the exemplary embodiment shown, electrical conductor 44 extends from stem 46 and through a flexible grommet 72 coupled to an aperture (not shown) in a boss 74 projecting from light bracket 70.

While the riding light 10 has been described and depicted in an exemplary embodiment adapted for mounting to the brake caliper brackets 14 of a motorcycle 12, it will be recognized that a riding light 10 according to the invention could be mounted to other locations on a motorcycle 12 having pre-existing fastener holes 40 for securing a light bracket 38. In a preferred embodiment, the pre-existing threaded fastener bore 40 is provided on a machined surface of the motorcycle structure, whereby proper orientation and secure mounting of the light 10 may be achieved. Alternatively, the riding light 10 may be secured to a motorcycle 12 at any location where a tapped hole can be formed to receive a mounting fastener. In an exemplary embodiment, riding light 10 comprises a light housing 32 and mounting bracket 38 formed from aluminum and having a brushed metal finish. Alternatively, housing 32 and bracket 38 may be formed from various other materials and provided with various other finishes, as may be desired.

While the present invention has been illustrated by the description of the various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicant's general inventive concept.

What is claimed is:

1. An accessory riding light for a motorcycle having an electrical system and at least one pre-existing fastener mounting hole, the riding light comprising:

a bracket configured for mounting to the motorcycle through the pre-existing fastener hole;

a light bulb couplable to the electrical system of the motorcycle; and a light housing configured to receive and support said light bulb, said light housing having a mounting member couplable to said bracket;

wherein said bracket comprises first and second bracket members;

said first bracket member couplable to said light housing;

said second bracket member couplable to the pre-existing fastener hole;

said first and second bracket members being secured to each other;

wherein said first bracket member comprises a mounting bore sized to engage therein said mounting member of said light housing; and wherein said mounting bore of said first bracket member is adjustable to facilitate frictional engagement with said mounting member of said light housing.

2. An accessory riding light for a motorcycle having an electrical system and at least one pre-existing fastener mounting hole, the riding light comprising:

a bracket configured for mounting to the motorcycle through the pre-existing fastener hole;

a light bulb couplable to the electrical system of the motorcycle; and a light housing configured to receive and support said light bulb, said light housing having a mounting member couplable to said bracket;

wherein said bracket comprises first and second bracket members;

said first bracket member couplable to said light housing;

said second bracket member couplable to the pre-existing fastener hole;

said first and second bracket members being secured to each other;

wherein said first and second bracket members include alignable through-bores sized to receive a fastener adapted to be received in the pre-existing fastener mounting hole of the motorcycle.

3. An accessory riding light for a motorcycle having an electrical system and at least one pre-existing fastener mounting hole, the riding light comprising:

a bracket configured for mounting to the motorcycle through the pre-existing fastener hole;

a light bulb couplable to the electrical system of the motorcycle; and a light housing configured to receive and support said light bulb, said light housing having a mounting member couplable to said bracket;

wherein the pre-existing fastener mounting hole is provided on a brake caliper mounting bracket, said riding light bracket configured for mounting to the pre-existing fastener mounting hole of the brake caliper mounting bracket.

4. A vehicle light assembly, comprising:

a housing having an opening covered by a lens, a light bulb within said housing and a mounting stem extending outwardly from said housing;

an insulated electrical wire having a first end connected to said bulb and a second end extending outwardly from said stem at a point remote from said housing;

a first bracket member having first and second sides and an aperture formed therethrough;

said mounting stem extending through said aperture such that said second end of said wire extends outwardly of said second side of said first bracket member; and a second bracket member having first and second sides and an outer periphery, said second bracket member including a recess formed into said first side and a passage between said recess and said periphery;

said second end of said electrical wire extending into said recess and exiting through said passage when said first and second bracket members are coupled in a superposed position with said recess in said second bracket member communicating with said aperture in said first bracket member.

5. The vehicle light assembly of claim 4, wherein said aperture through said first bracket member is adjustable in size to facilitate frictional engagement of said aperture and said stem.

6. The vehicle light assembly of claim 5, wherein said first bracket member includes a slot formed between said first and second sides to define an adjustment gap for adjusting the size of said aperture.

7. The vehicle light assembly of claim 4, further comprising through bores formed in said first and second bracket members, said through bores aligned when said first and second bracket members are in said superposed position such that a fastener can be received therethrough.

8. The vehicle light assembly of claim 4, further comprising a through bore formed in one of said first and second bracket members, and a blind hole formed in the other of said first and second bracket members, said bore and said blind hole aligned when said first and second bracket members are in said superposed position such that a fastener can be received through said bore to engage said blind hole.

9. A vehicle light assembly, comprising:

a housing having an opening covered by a lens, a light bulb within said housing and a mounting stem extending outwardly from said housing;

an insulated electrical wire having a first end connected to said bulb and a second end extending outwardly from said stem at a point remote from said housing; and a first bracket member having first and second sides, an aperture formed therethrough, and a slot formed between said first and second sides to define an adjustment gap for adjusting the size of said aperture;

said mounting stem extending through said aperture such that said second end of said wire extends outwardly of said second side of said first bracket member.

\* \* \* \* \*